April 28, 1959     M. L. WITTER     2,884,000
FLUID PRESSURE OPERATED AIR INJECTOR
Filed April 1, 1958     2 Sheets-Sheet 1
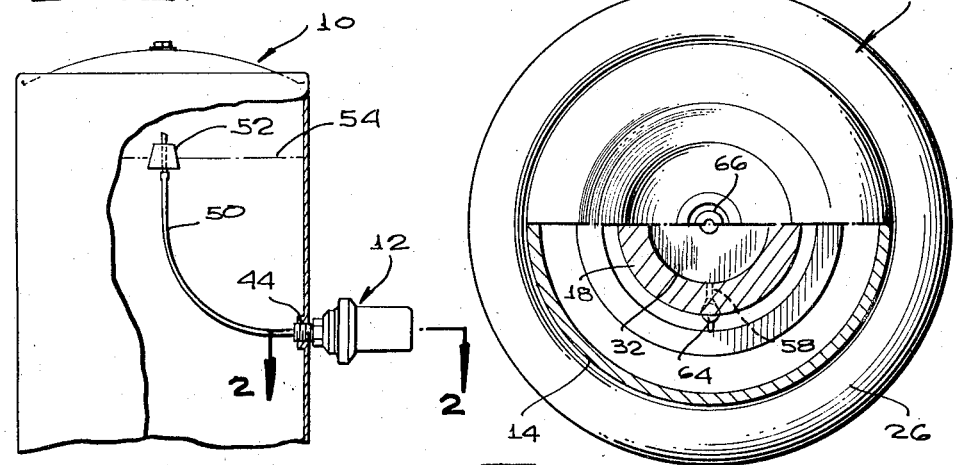
FIG. 1
FIG. 3
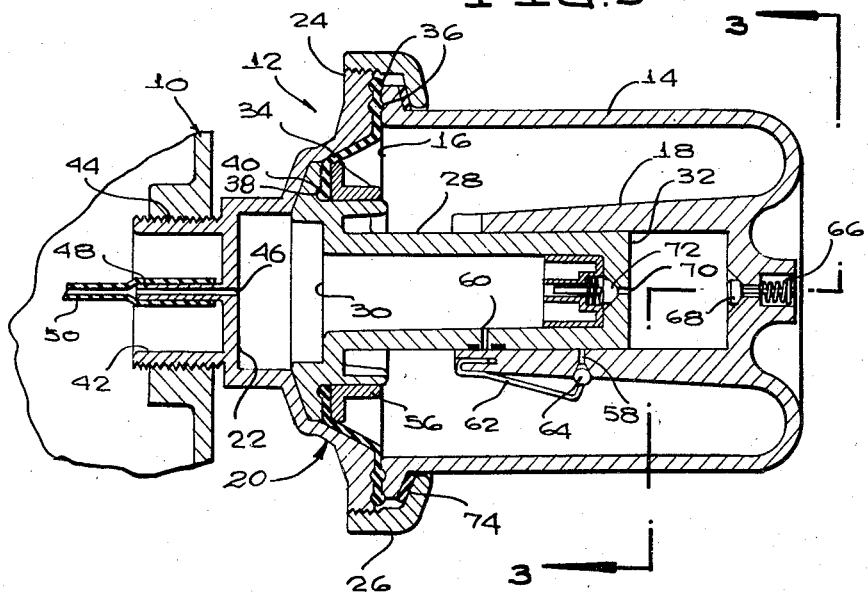
FIG. 2
INVENTOR.
MELVIN L. WITTER
BY
McMorrow, Berman + Davidson
ATTORNEYS April 28, 1959     M. L. WITTER     2,884,000
FLUID PRESSURE OPERATED AIR INJECTOR
Filed April 1, 1958     2 Sheets-Sheet 2
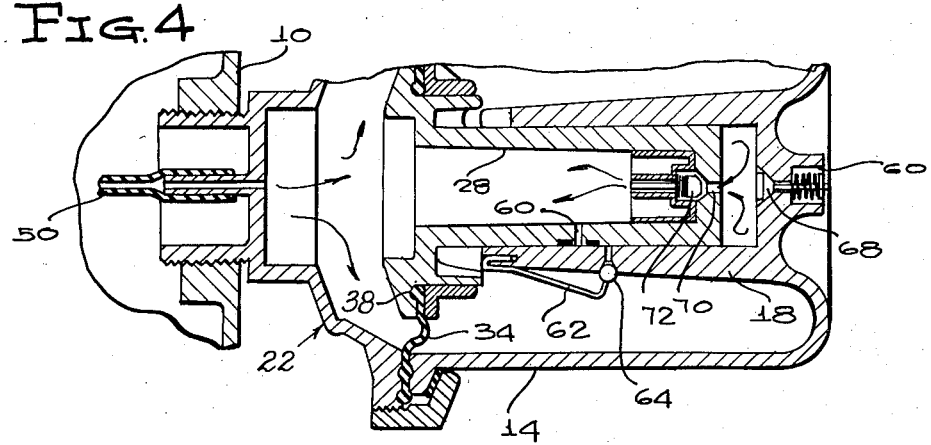
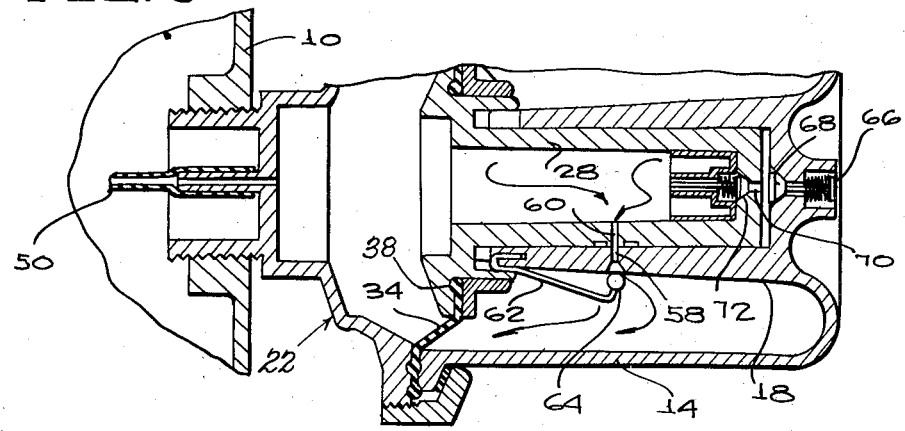
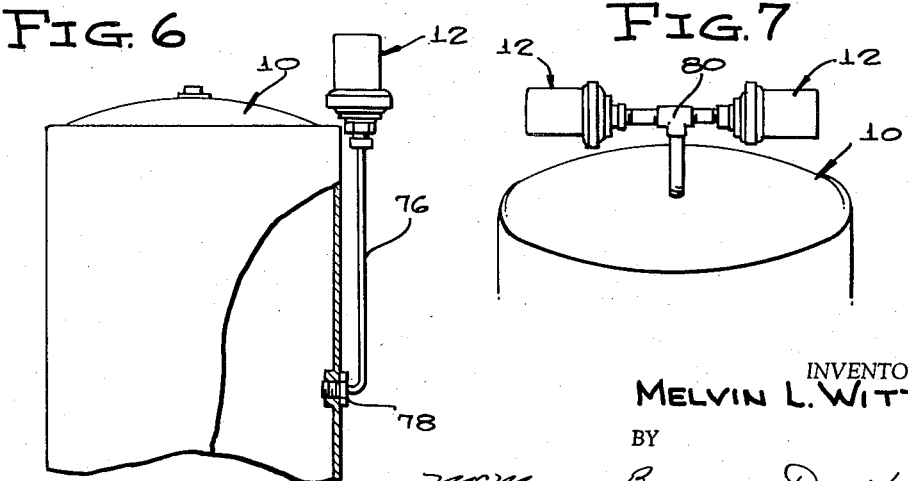
INVENTOR.
MELVIN L. WITTER
BY
McMorrow, Berman & Davidson
ATTORNEYS

United States Patent Office 2,884,000
Patented Apr. 28, 1959

2,884,000

FLUID PRESSURE OPERATED AIR INJECTOR

Melvin L. Witter, Big Spring, Tex., assignor of ten percent to W. R. Struble, Dallas, and twelve and one-half percent each to T. B. Atkins and Marvin R. Saunders, both of Big Spring, Tex.

Application April 1, 1958, Serial No. 725,750

2 Claims. (Cl. 137—209)

The present invention relates to a device for automatically maintaining a predetermined air volume under a given pressure in the space above a body of water contained in a supply tank.

An object of the present invention is to provide a device which is adaptable for use in a water supply system to replenish a determinable quantity of air into the water supply tank thereof during each cycle of pressure variation in the tank.

Another object of the present invention is to provide a device which lends itself for use with a water supply tank of any water supply system for maintaining a predetermined air volume under a given pressure in the top of the supply tank, and which is highly efficient in action.

A further object of the present invention is to provide an air regulator for controlling the volume and pressure of air in the upper portion of a water storage tank which is simple in structure, one sturdy in construction, one economically feasible, and one which is highly effective in action.

These and other objects and advantages of the present invention will be fully apparent from the following description when taken in conjunction with the annexed drawings, in which:

Figure 1 is an elevational view, partly in section, of the upper end portion of a water storage tank, showing the device of the present invention installed thereon;

Figure 2 is a sectional view, on an enlarged scale, taken on the line 2—2 of Figure 1;

Figure 3 is a view taken on the line 3—3 of Figure 2;

Figure 4 is a sectional view with parts broken away similar to Figure 2, showing one phase of the operation of the device of the present invention;

Figure 5 is a view similar to Figure 4, showing a second phase of operation;

Figure 6 is a partial elevational view of a water storage tank, a portion being shown in section, with the device of the present invention installed thereon in a modified form of installation; and Figure 7 is a view similar to Figure 6, showing still another modified form of installation of the device of the present invention.

Referring in greater detail to the drawings in which like numerals indicate like parts throughout the several views, the device of the present invention is for use in a water storage tank of the type in which water is alternatingly pumped into the bottom of the tank and withdrawn therefrom, there being provided in the upper-end portion of the tank a quantity of air between predescribed volume limits forming a compressible cushion for the water pumped into the lower part of the tank and constituting the means by which the water is forced out of the tank into a distribution system such as a domestic water supply. Such a water tank is shown in Figure 1 and designated generally by the reference numeral 10.

The device of the present invention is designated generally by the reference numeral 12 and comprises a casing 14 having one end open as designated by the reference numeral 16 in Figure 2. An open-ended sleeve 18 is positioned within the casing 14 and extends longitudinally inwardly of the end of the casing 14 remote from the open end 16, such other end being closed, the one end of the sleeve 18 and the closed end of the casing 14 being formed integrally.

The present invention provides a cup-shaped coupling member 20, having a bottom 22, the member 20 being positioned so that the bottom 22 faces toward the open end 16 of the casing 14 with the rim portion 24 of the member 20 sealingly attached to the portion of the casing 14 surrounding the open end 16. The periphery of the coupling member 20 is provided with external threads threadedly engaged by internal threads formed on the inner periphery of a ring element 26.

A hollow piston 28, having one end open, as at 30 in Figure 2, and the other end closed, is arranged so that the open end 30 is within and contiguous to the rim portion 24 of the coupling member 20. The closed end 32 of the piston 28, and the adjacent portion of the piston 28, extends into and is slidably mounted in the sleeve 18 with a portion thereof extending through the open end of the sleeve 18.

A flexible diaphragm 34 extends about the open end of the piston 28 and connects the piston 28 to the rim portion 24 of the coupling member 20, and to the open end 16 of the casing 14, for limited reciprocatory movement of the piston 28 relative to the sleeve 18. The diaphragm 34 is annular in shape and is provided on its outer peripheral portion with a pair of beads 36 received in complementally formed grooves provided in the rim portion 24 of the coupling member 20. One bead 36 is also received in a complementally arranged groove provided in the outer flange portion of the casing 14, as shown most clearly in Figure 2. Another bead 38 on the inner periphery of the diaphragm 34 is received in a complemental groove provided on the underface of the piston head, as designated by the numeral 40 in Figure 2.

An externally threaded nipple 42 projects exteriorly from the bottom 22 of the coupling member 20 for attachment of the device 12 to the water storage tank 10, such tank 10 being provided with an internally threaded aperture in the upper portion thereof, as at 44 in Figure 1.

An aperture 46 extends through the bottom 22 of the coupling member 20 and a nipple 48, arranged concentrically within the nipple 42, has one end connected in communication with the aperture 46 and is adapted for attachment, by such means as a flexible conduit 50 so that the interior of the piston 28 may be connected to the interior of the tank 10 above the level of the water therein, as shown in Figure 1. A float 52 supports the open free end portion of the flexible conduit 50 above the surface of the water, such surface being illustrated by a dotted line designated by the reference numeral 54.

A flanged ring 56 is circumposed about a portion of the piston 28 adjacent the head thereof and bears against the inner peripheral portion of the diaphragm 34, securing the latter to the head of the piston 28.

The sleeve 18 is provided with a transverse passage 58 adjacent the open end of the sleeve 18, the passage 58 being registrable with a port 60 provided in the side of the piston 28 intermediate the ends thereof when the piston 28 has been shifted so that its closed end 32 is adjacent to the closed end of the sleeve 18, as shown in Figure 5. A spring wire 62 has one end anchored in the sleeve 18 adjacent the open end of the latter and has a ball head 64 at its other end normally closing the passage 58 in the sleeve 18, as shown in Figures 2 and 4.

The closed end of the casing 14 is provided with a port 66, centrally thereof, with a spring-biased valve 68 in the port 66 normally closing the latter and permitting flow of air in one direction only, that from the exterior of the casing 14 into the interior of the casing 14 between the closed end of the sleeve 18 and the adjacent face of the closed end 32 of the piston 28. The closed end of the piston 28 is also provided with a port 70 normally closed by a spring-biased valve 72 which is so arranged as to prevent flow of air from the interior of the piston 28 back into the space between the piston closed end 32 and the closed end of the sleeve 18 but permitting air to be moved from the space between the piston closed end 32 and the sleeve closed end into the interior of the piston 28. Exteriorly of the sleeve 18 and the piston 28 and within the wall of the casing 14, also closed by the diaphragm 34, is an expansion chamber for air received through the passage 58 from the interior of the tank 10 when the port 60 and the piston 28 is in registry with the passage 58.

An annular gasket 74 extends about the flanged end portion of the casing 14 and is sealingly engaged by the inwardly turned portion of the ring element 26.

In operation, it is assumed that the tank 10 is connected at its lower end to a pump and also to a distribution system, such as a residential water supply system. The pump is conventionally provided with an automatic switch which is set to operate between predetermined pressures such as 20 pounds to the square inch for "cut-in" and 40 pounds to the square inch for "cut-out." Assuming that the tank 10 has been previously pumped to the highest pressure, upon withdrawal of water from the lower end portion of the tank 10, the pressure will drop. When the pressure within the tank 10 drops to a point below the pressure within the expansion chamber formed in the casing 14, the piston 28 is shifted to the left as in Figure 2, forming a partial vacuum within the space between the sleeve closed end and the piston closed end and permitting air to enter through the port 66, raising the valve 68 from its complemental valve seat. When the tank low pressure point has been reached, the pump will start and will replenish the water within the tank, raising the pressure, with air being forced through the conduit 50 into the interior of the coupling member 20 to effect the movement of the piston, as in Figure 4, and forcing the air which was within the sleeve ahead of the piston closed end through the port 70, raising the valve 72 from its complemental seat and permitting the air within the space ahead of the piston closed end 32 to flow into the interior of the piston 28. When the piston 28 is moved to the limit of its movement to the right, as in Figure 5, the port 60 will be in registry with the passage 58 and, upon increasing of the pressure within the tank 10, the ball head 64 will lift from its seat and permit the air within the expansion chamber to become at the same pressure as the air in the tank 10. Upon withdrawal of more water from the tank 10, the diaphragm will be shifted to the left by the differential in pressure of the air within the expansion chamber and that now in the tank 10, completing the cycle and drawing more air through the casing closed end port 66 into the space in the sleeve 18 between the closed end of the sleeve 18 and the closed end 32 of the piston 28.

This action repeats itself at each pumping action of the tank pump and serves to maintain the volume and pressure of the air within the tank 10 at predetermined desired value.

In Figure 6, the conduit 50 and float 52 have been omitted and the device 12 is mounted exteriorly of the tank 10 with a rigid pipe 76 extending between the device nipple 42 and a coupling element 78 received in the aperture provided in the side of the tank 10. For certain applications, it may be desirable to connect more than one device 12 to the tank 10 and this arrangement is shown in Figure 7 in which a pair of devices of the present invention are supported upon a coupling assembly including a T-coupling 80, the coupling assembly extending into an aperture provided in the upper end of the tank 10.

What is claimed is:

1. In combination with a water storage tank having a quantity of air under pressure therein, means for alternately varying said pressure within desired predetermined limits and an air inlet to said tank, a device comprising a casing having one end open and having the other end closed, an open-ended sleeve positioned within said casing and extending longitudinally inwardly from the closed end of said casing and having one of the open ends integrally attached to the casing closed end, a cup-shaped coupling member including a bottom positioned so that the bottom faces toward the open one end of said casing and having the rim portion sealingly attached to the one open end of said casing, a hollow piston having one end open and the other end closed arranged so that the open end is within and contiguous to the rim portion of said coupling member with the closed end and the adjacent portion extending slidably into said sleeve through the open end thereof, a flexible diaphragm extending about the open end of said piston and connecting said piston to the rim portion of said coupling member for limited reciprocatory movement of said piston relative to said sleeve, a nipple projecting exteriorly from the bottom of said coupling member and attached to said air inlet, there being an aperture in said coupling member bottom for flow of air therethrough, the space between said casing, sleeve, piston, and diaphragm defining an expansion chamber, said sleeve having a transverse passage adjacent the other open end thereof and registrable with a port formed in said piston intermediate the ends thereof for discharging air under pressure from said piston into said chamber, a check valve controlled port in the closed end of said piston for admitting air under pressure from the portion between said piston and the closed end of said sleeve to the piston, a check valve controlled port in the closed end of said casing for admitting air under pressure into the portion between said sleeve and the closed end of said piston, and a check valve in said passage for permitting the flow of air under pressure from said piston into said chamber.

2. In combination with a water storage tank having a quantity of air under pressure therein, means for alternately varying said pressure within desired predetermined limits and an air inlet to said tank, a device comprising a casing having one end open, an open ended sleeve positioned within said casing and extending longitudinally of said casing and having one end integrally attached to the casing, a coupling member including a bottom positioned so that the bottom faces toward the open end of said casing and sealingly attached to the open end of said casing, a hollow piston having one end open and the other end closed arranged so that the open end is within and contiguous to said coupling member with the closed end and the adjacent portion extending slidably into said sleeve through the open end thereof, flexible means connecting said piston to said coupling member for limited reciprocatory movement of said piston relative to said sleeve, means on the bottom of said coupling member and attached to said air inlet, there being an aperture in said coupling member bottom for a flow of air therethrough, the space between said casing, sleeve, piston, and flexible means defining an expansion chamber, said sleeve having a transverse passage adjacent the other open end thereof and registrable with a port formed in said piston intermediate the ends thereof for discharging air under pressure from said piston into said chamber, a check valve control port in the closed end of said piston for admitting air under pressure from the portion between said piston and the closed end of said sleeve to the piston, a check valve control port in the closed end of said casing for admitting air under pressure into the portion between said sleeve and the closed end of said piston, and a check valve in said passage for permitting the flow of air under pressure from said piston into said chamber.

References Cited in the file of this patent
UNITED STATES PATENTS

| | | |
|---|---|---|
| 2,650,606 | Amidon | Sept. 1, 1953 |
| 2,822,121 | Sadler | Feb. 4, 1958 |